United States Patent [19]

Will

[11] Patent Number: 5,286,946
[45] Date of Patent: Feb. 15, 1994

[54] METHOD AND APPARATUS FOR SECURING AN END OF A HEADBOX FLOW TUBE

[75] Inventor: David J. Will, Beloit, Wis.

[73] Assignee: Beloit Technologies, Inc., Wilmington, Del.

[21] Appl. No.: 939,183

[22] Filed: Sep. 2, 1992

[51] Int. Cl.⁵ .......................................... B23K 26/00
[52] U.S. Cl. .............................. 219/121.64; 162/336; 219/121.72; 219/121.63
[58] Field of Search ...................... 219/121.63, 121.64, 219/121.13, 121.14, 121.34, 121.67, 121.72; 162/336, 342, 259

[56] References Cited

U.S. PATENT DOCUMENTS

| | | | |
|---|---|---|---|
| 3,878,039 | 4/1975 | Descary et al. | 162/336 |
| 3,977,938 | 8/1976 | Descary et al. | 162/336 X |
| 4,298,429 | 11/1981 | Hergert et al. | 162/343 |
| 4,770,744 | 9/1988 | Dove | 162/259 |

Primary Examiner—C. L. Albritton
Attorney, Agent, or Firm—Dirk J. Veneman; Raymond W. Campbell; David J. Archer

[57] ABSTRACT

A method and apparatus are disclosed for securing an end of a headbox flow tube to an end plate. The method includes the steps of laser cutting the end plate such that the end plate defines an opening for reception therein of the end of the flow tube. The end of the flow tube is positioned within the opening, and the end of the flow tube is laser welded to the end plate in the vicinity of the opening for generating a water tight seal between the end of the flow tube and the end plate.

9 Claims, 2 Drawing Sheets

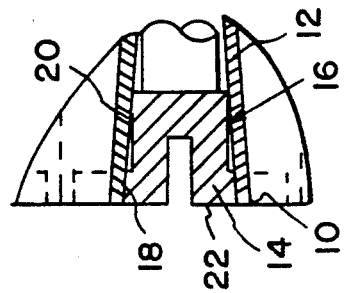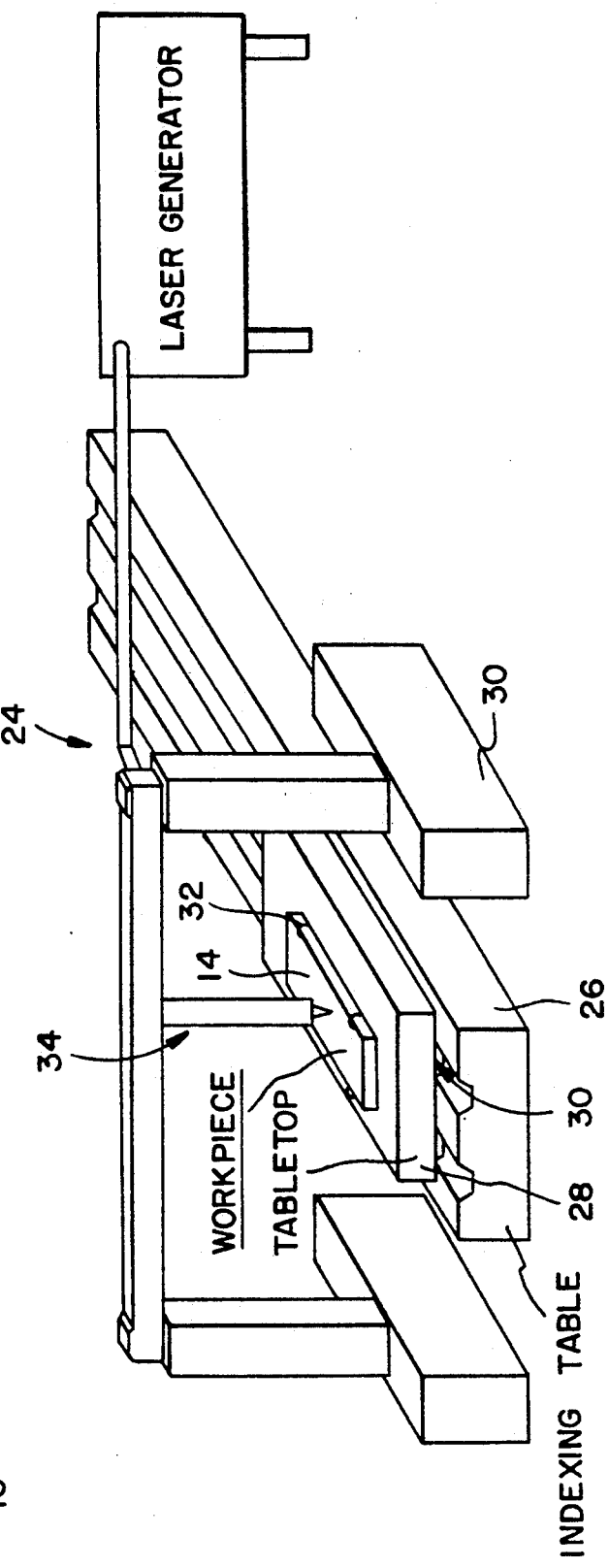

METHOD AND APPARATUS FOR SECURING AN END OF A HEADBOX FLOW TUBE

BACKGROUND OF THE INVENTION

1. Field of the Invention

The present invention relates to a method for securing an end of a headbox flow tube to an end plate. More specifically, the present invention relates to a method and apparatus for securing an end of a headbox flow tube to an end plate of a headbox for a papermaking machine.

2. Information Disclosure Statement

In the papermaking art, stock is ejected from a headbox onto a moving fourdrinier wire such that water within the stock drains through the fourdrinier wire for forming a web on the top surface of the wire.

The headbox is supplied with pressurized stock and essentially includes a tapered header for supplying the stock to a plurality of headbox flow tubes arranged as a tube bank. The stock flows through each of the flow tubes so that the stock is divided into a plurality of parallel flow paths.

The stock emerging from the flow tubes is guided through a slice chamber towards a slice lip at the downstream end of the slice chamber, where the stock is ejected onto the fourdrinier wire.

The plurality of flow tubes are supported within the headbox by an end plate which supports the downstream end of each of the flow tubes. The arrangement is such that the tubes are arranged in horizontal rows, each row being spaced vertically relative to an adjacent row.

Trailing elements are pivotally secured within the end plate such that each row of flow tubes is separated by a trailing element. The arrangement is such that the flow of stock through the slice chamber is divided according to the number of rows of the flow tubes.

In prior art headboxes, the flow tubes were typically of circular cross-sectional configuration at both the upstream and downstream ends thereof.

However, as disclosed in co-pending patent application Ser. No. 07/772,521 to Shands et al, it has been found extremely advantageous to provide the downstream end of such headbox flow tube with a rectangular cross-sectional configuration.

More specifically, the downstream portion of the flow tube progressively changes from a circular cross-sectional configuration to a rectangular shaped configuration adjacent to the downstream end of the tube.

Accordingly, in the prior art flow tube, during the manufacture of a tube bank, the end plate was drilled and machined to a circular configuration for the reception therein of the circular end of a corresponding flow tube. Hydraulic expansion means such as a mandrel of the like were used to expand the end of the headbox flow tube to form a wedge fit within the end plate. Subsequently, the end of the flow tube was welded to the end plate.

However, with the advent of the aforementioned rectangular end type flow tube, the aforementioned method of manufacture becomes inoperative.

The present invention provides a method for laser cutting the end plate of a headbox tube bank for the reception therein of the end of the flow tube, such that the flow tube can be laser welded to the end plate, thereby providing a water tight seal therebetween.

Therefore, it is a primary objected of the present invention to provide a method for securing an end of a headbox flow tube to an end plate that overcomes the aforementioned problems associated with the prior art methods, and which makes a considerable contribution to the art of building of a headbox tube bank.

Another object of the present invention is the provision of a method for securing an end of a headbox flow tube to an end plate which inhibits heat deformation of the flow tubes.

Another object of the present invention is the provision of a method for securing an end of a headbox flow tube to an end plate which avoids the necessity for the provision of welding fillers and the like between the end plate and the flow tube.

Other objects and advantages of the present invention will be readily apparent to those skilled in the art by consideration the detailed description contains hereinafter, taken in conjunction with the annexed drawings.

SUMMARY OF THE INVENTION

The present invention relates to a method and apparatus for securing an end of a headbox flow tube to an end plate. The method comprises the steps of laser cutting the end plates such that the end plate defines an opening for reception therein of the end of the flow tube. The end of the flow tube is positioned within the opening, and the end of the flow tube is laser welded to the end of the plate in the vicinity of the opening for generating a water tight seal between the end of the flow tube and the end plate.

In a more specific embodiment of the present invention, the opening is of generally rectangular configuration for receiving therein the end of the flow tube, which is of a correspondingly substantially rectangular cross-sectional configuration.

The step of cutting the opening specifically includes cutting the opening to define a generally rectangular bore, and further cutting the opening to define a generally rectangular shaped counter bore. The counter bore is larger than the bore for the reception therethrough of the end of the flow tube, which is of tapered rectangular cross-sectional configuration. The arrangement is such that the end of the flow tube cooperates with and provides an interference fit relative to the end of the flow tube, while the counter-bore provides an interference fit with the flow tube immediately upstream relative to the end of the flow tube. The arrangement is such that the tapered rectangular cross-sectional configuration of the flow tube is accommodated within the end plate opening.

The step of positioning the end of the flow tube also includes adjusting the axial location of the flow tube within the opening such that the end of the flow tube and a downstream side of the end plate are co-planar.

The step of laser welding the end of the flow tube includes laser welding the end of the flow tube to the end plate to a depth within the range 0.08 to 0.1 inches, such that heat deformation of the flow tube is minimized.

The cutting and welding step are carried out by using the same apparatus. The cutting step is accomplished by the application of a higher power density relative to the power density utilized during the welding step.

The present invention also includes an apparatus for securing a downstream end of a headbox flow tube to an end plate. The apparatus includes an indexing table which is disposed substantially horizontally. A table top is slidably disposed above the indexing table, and control means are provided for sliding the table top relative to the indexing table. Means are provided for securing the end plate to the table top. Laser means are movably secured above the end plate such that during use of the apparatus, the laser means moves relative to the end plate for cutting therefrom a plurality of substantially rectangular shaped openings for the reception therein of correspondingly rectangular shaped downstream ends of the headbox flow tubes. The arrangement is such that when the rectangular ends of the flow tubes have been located within the corresponding rectangular openings, the laser means subsequently enables laser welding of the ends of the flow tubes to the end plate in the vicinity of the openings. The arrangement enables the generation of a water-tight seal between the respective ends of the flow tubes and the end plate while inhibiting heat deformation of the flow tubes.

More specifically, the openings are disposed in rows with each row being separated from an adjacent row such that openings of each of the rows are in alignment relative to each other.

Adjacent openings within each of the rows are spaced at a distance within the range 0.04 to 0.08 inches.

Many modifications and variations of the present invention will be readily apparent to those skilled in the art by consideration of the detailed description contained hereinafter, taken in conjunction with the annexed drawings. However, such modifications and variations fall within the spirit and scope of the present invention as defined by the appended claims.

BRIEF DESCRIPTION OF THE DRAWINGS

FIG. 3 is an enlarged sectional view of the end plate according to the present invention; and FIG. 4 is a perspective view of the apparatus according to the present invention.

Similar reference characters refer to similar parts about the various drawings.

DETAILED DESCRIPTION OF THE DRAWINGS

Figure 1:
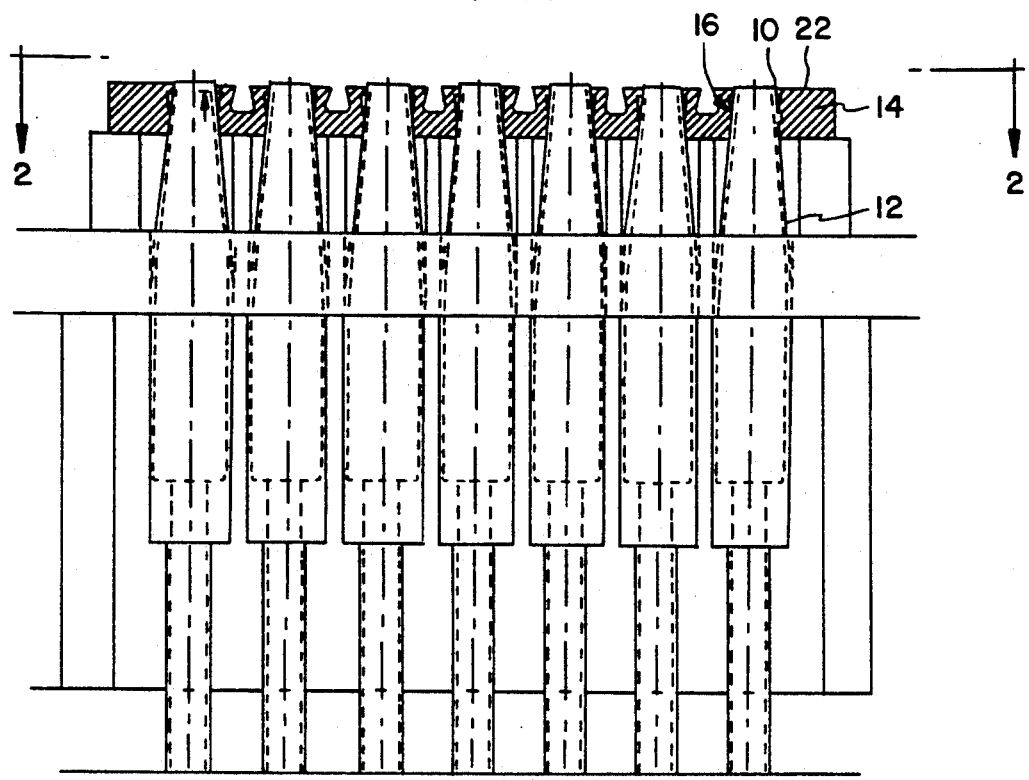
FIG. 1 is a side-sectional view illustrating a method for securing a flow tube to an end plate according to the present invention.

FIG. 1 is a side sectional view illustrating a method for securing an end 10 of a headbox flow tube 12 to an end plate 14. The method comprises the steps of laser cutting the end plate 14 such that the end plate 14 defines an opening generally designated 16 for the reception therein of the end 10 of the flow tube 12.

The end 10 of the flow tube 12 is positioned within the opening 16.

Subsequently, the end 10 of the flow tube 12 is laser welded to the end plate 14 in the vicinity of the opening 16 for generating a water tight seal between the end 10 of the flow tube 12 and the end plate 14.

Figure 2:
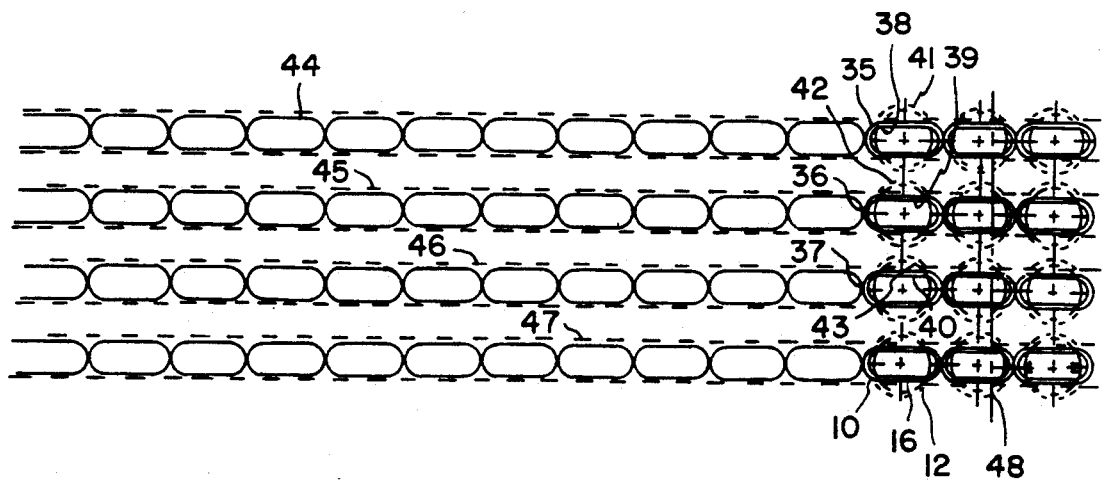
FIG. 2 is a sectional view taken on the line 2—2 of FIG. 1.

FIG. 2 is a view taken on the line 2—2 of FIG. 1 and shows the opening 16 which is of generally rectangular configuration for receiving therein the end 10 of the flow tube 12 which is of a correspondingly substantially rectangular cross-sectional configuration.

FIG. 3 is an enlarged sectional view of the end plate 14 showing parts of the adjacent flow tubes. FIG. 3 illustrates the step of cutting the opening 16 includes cutting the opening 16 to define a generally rectangular shaped bore 18.

The step of cutting also includes further cutting the opening 16 to define a generally rectangular shaped counter bore 20. The counter bore 20 is larger than the bore 18 for the reception therethrough of the end 10 of the flow tube 12 which is of tapered rectangular cross-sectional configuration.

The arrangement is such that the end 10 of the flow tube 12 corresponds with and provides an interference fit with the end 10 of the flow tube 12.

Additionally, the counter bore 20 provides an interference fit with the flow tube 12 immediately upstream, relative to the end 10 of the flow tube 12, so that the tapered rectangular cross-sectional configuration of the flow tube 12 is accommodated within the end plate opening 16.

The step of positioning the end 10 of the flow tube 12 further includes adjusting the axial location of the flow tube 12 within the opening 16 such that the end 10 of the flow tube 12 and a downstream side 22 of the plate 14 are co-planar.

The step of laser welding the end 10 of the tube 12 includes laser welding the end 10 of the flow tube 12 to the end plate 14 to a depth within the range 0.08 to 0.1 inches such that heat deformation of the flow tube 12 is minimized.

The cutting and welding step are carried out by using the same apparatus. FIG. 4 is a perspective view of the apparatus generally designated 24 for cutting and welding. The cutting step is accomplished by the application of a higher power density relative to the power density utilized during the welding step.

FIG. 4 shows the apparatus 24 for securing a downstream end 10 of a headbox flow tube 12 to an end plate 14. The apparatus 24 includes an indexing table 26 which is disposed substantially horizontally. A table top 28 is slidably disposed above the indexing table 26. Control means generally designated 30 are provided for sliding the table top 28 relative to the indexing table 28. Means 32 secure the end plate 14 to the table top 28.

Laser means generally designated 34 are movably secured above the end plate 14 such that during use of the apparatus 24, the laser means 34 moves relative to the end plate 14 for cutting therefrom a plurality of substantially rectangular shaped openings 35, 36, 37 and 16. As shown in FIG. 2 for the reception therein of correspondingly rectangular shaped downstream ends 38, 39, 40 and 10 of the headbox flow tubes 41, 42, 43 and 12. The arrangement is such that when the rectangular ends 38, 39, 40 and 10 of the flow tubes 41, 42, 43 and 12 have been located within the corresponding rectangular openings 35, 36, 37 and 16 the laser means 34 subsequently enables laser welding of the end of the flow tubes to the end plate 14 in the vicinity of the openings for generating a water tight seal between the respective ends of the flow tubes and the end plate 14 while inhibiting heat deformation of the flow tubes 41, 42, 43 and 12.

The openings 35, 36, 37, and 16 as shown in FIG. 2 are disposed in rows 44, 45, 46, and 47. Each row 44 to 47 is separated from an adjacent row such that openings 35, 36, 37 and 16 of each of the rows 44 to 47 are in alignment relative to each other.

Adjacent openings, for example 16 and 48, within each of the rows, for example row 47, is spaced at a distance within the range 0.04 to 0.08 inches.

The present invention provides a method for securing the rectangular end of a headbox flow tube to an end plate, so that heat deformation of the flow tube is minimized and the introduction of additional welding material is avoided.

What is claimed is:

1. A method for securing an end of a headbox flow tube to an end plate, said method comprising the steps of:

laser cutting the end plate such that the end plate defines an opening for the reception therein of the end of the flow tube;

positioning the end of the flow tube within the opening; and laser welding the end of the flow tube to the end plate in the vicinity of the opening for generating a water-tight seal between the end of the flow tube and the end plate.

2. A method as set forth in claim 1, wherein the opening is of generally rectangular configuration for receiving therein the end of the flow tube which is of a corresponding substantially rectangular cross-sectional configuration.

3. A method as set forth in claim 1, wherein the step of cutting the opening includes:

cutting the opening to define a generally rectangular shaped bore;

further cutting the opening to define a generally rectangular shaped counter-bore, the counter-bore being larger than the bore for the reception therethrough of the end of the flow tube which is of a tapered rectangular cross-sectional configuration such that the end of the flow tube corresponds with and provides an interference fit with the end of the flow tube while the counter-bore provides an interference fit with the flow tube immediately upstream relative to the end of the flow tube so that the tapered rectangular cross-sectional configuration of the flow tube is accommodated within the end plate opening.

4. A method as set forth in claim 1, wherein the step of positioning the end of the flow tube further includes:

adjusting the axial location of the flow tube within the opening such that the end of the flow tube and a downstream side of the end plate are co-planar.

5. A method as set forth in claim 1, wherein the step of laser welding the end of the flow tube includes:

laser welding the end of the flow tube to the end plate to a depth within the range 0.08 to 0.1 inches such that heat deformation of the flow tube is minimized.

6. A method as set forth in claim 1, wherein the cutting and welding step are carried out by using the same apparatus, the cutting step being accomplished by the application of a higher power density relative to the power density utilized during the welding step.

7. An apparatus for securing a downstream end of a headbox flow tube to an end plate, said apparatus comprising:

an indexing table disposed substantially horizontally;

a table top slidably disposed above said indexing table;

control means for sliding said table top relative to said indexing table;

means for securing the end plate to said table top;

laser means movably secured above the end plate such that during use of the apparatus, said laser means moves relative to said end plate for cutting therefrom a plurality of substantially rectangular shaped openings for the reception therein of correspondingly rectangular shaped downstream ends of the headbox flow tubes, the arrangement being such that when said rectangular ends of the flow tubes have been located within said corresponding rectangular openings, said laser means subsequently enables laser welding of the end of the flow tubes to the end plate in the vicinity of said openings for generating a water-tight seal between the rspective ends of the flow tubes and the end plate while inhibiting heat deformation of the flow tubes.

8. An apparatus as set forth in claim 7, wherein said openings are disposed in rows, each row being separated from an adjacent row such that openings of each of said rows are in alignment relative to each other.

9. An apparatus as set forth in claim 8, wherein each adjacent opening within each of said rows is spaced at a distance within the range 0.040 to 0.080 inches.

* * * * *